(12) United States Patent
Yadav et al.

(10) Patent No.: US 10,542,495 B2
(45) Date of Patent: Jan. 21, 2020

(54) INHIBITING SHORT DRX BASED ON DEVICE USE CONDITIONS

(71) Applicant: Microsoft Technology Licensing, LLC, Redmond, WA (US)

(72) Inventors: Mahesh Yadav, Redmond, WA (US); Taehwan Jung, Issaquah, WA (US); Srinivasa Rao, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 334 days.

(21) Appl. No.: 15/359,803

(22) Filed: Nov. 23, 2016

(65) Prior Publication Data
US 2018/0146430 A1 May 24, 2018

(51) Int. Cl.
*H04W 52/02* (2009.01)
*H04W 76/28* (2018.01)

(52) U.S. Cl.
CPC ... *H04W 52/0254* (2013.01); *H04W 52/0216* (2013.01); *H04W 52/0229* (2013.01); *H04W 52/0241* (2013.01); *H04W 76/28* (2018.02); *Y02D 70/00* (2018.01); *Y02D 70/1262* (2018.01); *Y02D 70/142* (2018.01); *Y02D 70/20* (2018.01); *Y02D 70/24* (2018.01)

(58) Field of Classification Search
CPC ............................... H04W 76/28; Y02D 70/24
See application file for complete search history.

(56) References Cited

U.S. PATENT DOCUMENTS

2014/0199995 A1* 7/2014 Singh .................. G06F 13/1663
455/426.1
2014/0321371 A1* 10/2014 Anderson ............. H04W 76/38
370/329
(Continued)

FOREIGN PATENT DOCUMENTS

WO 2015169405 A1 11/2015

OTHER PUBLICATIONS

An, et al., "Performance Analysis of Enhanced DRX Mechanism in LTE Networks", In Proceedings of International Conference on Computer Communication and Informatics, Jan. 3, 2014, 5 pages.
(Continued)

*Primary Examiner* — Phirin Sam
*Assistant Examiner* — Debebe A Asefa
(74) *Attorney, Agent, or Firm* — Ray Quinney & Nebeker, P.C.; Thomas M. Hardman; Matthew M. Walker (57) ABSTRACT

The embodiments of the disclosure include methods and apparatus that allow dynamic configuration of discontinuous reception (DRX) mode based on conditions associated with device use. For example, a device may be operating in a first mode of DRX having short and long DRX cycles that provide a level of user experience that is balanced with a level of power conservation. During operation, changing conditions of device use may indicate that the first configuration of the DRX may be changed to a second configuration by removing the short DRX cycle to conserve power without affecting the user's experience. For example, a user may move out of proximity of the device and may not be affected
(Continued)

by a slower speed of data downloading. Based on the changed conditions of device use, the DRX may be changed to operate in a second configuration that may download data slower but consumes less power.

16 Claims, 6 Drawing Sheets

(56) References Cited

U.S. PATENT DOCUMENTS

| | | |
|---|---|---|
| 2015/0009874 A1 | 1/2015 | Edara et al. |
| 2015/0105122 A1 | 4/2015 | Wei et al. |
| 2015/0117289 A1* | 4/2015 | Voigt ............... H04W 52/0232 370/311 |
| 2015/0223085 A1 | 8/2015 | Siomina |
| 2016/0150472 A1 | 5/2016 | Yoon et al. |
| 2016/0192328 A1 | 6/2016 | Nakahara et al. |
| 2016/0202114 A1 | 7/2016 | Alameh et al. |

OTHER PUBLICATIONS

Baek, et al., "Analysis of discontinuous reception (DRX) with both downlink and uplink packet arrivals in 3GPP LTE", In Proceedings of the 6th International Conference on Queueing Theory and Network Applications, Aug. 23, 2011, pp. 8-16.

Martin, "WirelessMoves: LTE Long and Short DRX Cycles to Save Power", Published on: Dec. 8, 2009, Available at: http://mobilesociety.typepad.com/mobile_life/2009/12/lte-long-and-short-drx-cycles-to-save-power.html.

"LTE Quick Reference" article, pp. 1-7, retrieved from http://www.sharetechnote.com/ on Oct. 23, 2016.

Pasupuleti, Kumar Swamy, "How LTE Stuff Works" pp. 1-8, retrieved from http://howltestuffworks.blogspot.com/2014/06/connected-mode-drx.html on Oct. 23, 2016.

3GPP TS 36.321 V14.0.0 (Sep. 2016) Technical Specification Group Radio Access Network; Evolved Universal Terrestrial Radio Access (E-UTRA); Medium Access Control (MAC) protocol specification, published Sep. 2016, pp. 43-46.

3GPP TS 36.331 V14.0.0 (Sep. 2016) Technical Specification Group Radio Access Network; Evolved Universal Terrestrial Radio Access (E-UTRA);Radio Resource Control (RRC) Protocol specification, published Sep. 2016, selected pages.

* cited by examiner

INHIBITING SHORT DRX BASED ON DEVICE USE CONDITIONS

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

The embodiments of the disclosure include methods and apparatus that allow dynamic configuration of a discontinuous reception (DRX) mode in a device based on conditions associated with device use. For example, a device may be operating in a first configuration of DRX mode that is configured to provide a level of user experience that is balanced with a level of power conservation. During device operation, changing conditions associated with device use may indicate that the first configuration of the DRX mode may be dynamically changed to conserve more device power without negatively affecting the user's experience by removing one or more short DRX sleep cycles. For example, a user of the device may have moved out of proximity of the device and the user's experience may not be affected by a slowdown in the time it takes to obtain a data channel. Based on the changing device use conditions, the DRX mode may be changed to operate in a second configuration that may take a longer time to obtain a data channel but consume less power by not using the one or more short DRX sleep cycles. For example, if the user is away from the device, the user not observe any connectivity or performance issues related to the extra time that it takes to receive and setup a skype call caused by not using the one or more short DRX sleep cycles.

When the use conditions change, the devices may change from the second configuration back to the first configuration. When in the first configuration, the one or more short DRX cycles are reinstated to improve the user experience. In an implementation, the conditions associated with device use may be based on whether or not a user may be detected in proximity of the device, and/or whether or not the device is in a sleep state.

In an example implementation, a device operating in a wireless network may activate a DRX mode including one or more short sleep cycles and one or more long sleep cycles upon expiration of a data inactivity timer that indicates that no data has been transferred between the device and network for a selected period of time. The device may then operate in DRX mode until data transfer activity is detected. The DRX mode may then be deactivated and the device may operate in continuous reception mode until the inactivity timer expires again. During operation in either DRX or normal mode, the device may determine that at least one condition associated with device use has been met. In response to the determination that the at least one condition is met, the device may initiate removal of the one or more short sleep cycles from the DRX mode. When DRX mode is next activated, upon expiration of the data inactivity timer, DRX mode will not contain the short sleep cycles and will use only long sleep cycles. The at least one condition may be the condition that a user is not detected in proximity of the device and/or the condition that the device is in sleep state. By removing the short DRX sleep cycles when no user presence is detected in proximity of the device and/or the device is in sleep state, devices configured according to the implementations use less power than device configured in a DRX mode that uses both short and long DRX sleep cycles. The removal of the short DRX sleep cycles may result in a longer time to obtain a data channel for the device, but the delay in obtaining a data channel does not affect the user's perceptual experience since the user is not in proximity of the device.

In the example implementation, while operating with the one or more short DRX sleep cycles removed from the DRX mode, the device may further determine that a selected condition of the at least one condition is no longer met. In response to the determination that the selected condition of the at least one condition is no longer met, the device may initiate reinstatement of the short DRX sleep cycles in the DRX mode. When DRX mode is next activated, upon expiration of the data inactivity timer, DRX mode will contain both the short DRX sleep cycles and the long sleep cycles. The at least one condition for reinstatement of the short DRX sleep cycles may be the condition that there is a user presence detected in proximity of the device or the condition that the device is in awake mode. By reinstating the short DRX sleep cycles when a user presence is detected in proximity of the device or the device is in wake mode, devices configured according to the implementations may provide faster data download time with a better experience for a user in proximity with the device. The reinstatement of the short DRX sleep cycles potentially uses more power in the device, but the faster data download times may positively affect the user's perceptual experience since the user is indicated to be in proximity of the device by the user presence detection and/or by the device being in the wake mode. The device may include a modem that is configured to operate in either of a connected state when data transfer with the network is taking place or in an idle state when no data is being transferred. The device may determine that at least one condition is met when the modem is in either of the idle state or the connected state. The discontinuous reception mode may be activated and deactivated when the modem is in the connected state.

In another example implementation, the methods and apparatus may be implemented in a Long Term Evolution (LTE) device operating on a data channel according to the $3^{rd}$ Generation Partnership Project (3GPP) LTE Standard Specifications. The device may include a user proximity/presence sensor and a device sleep/wake state monitor. The device may modify the LTE DRX cycles by removing the one or more short DRX sleep cycles based on indications provided by the user proximity sensor and device sleep state monitor that indicate whether there is a user presence detected in proximity of the device and/or whether the device is in sleep state. The device may also reinstate the removed short DRX sleep cycles from the DRX mode based on indications provided by the user proximity sensor and/or device sleep state monitor. In the LTE implementation, the device may perform the modification of the DRX mode and/or reinstatement of the short DRX sleep cycles by initiating negotiation with the LTE network. This implementation improves the performance of the LTE device by allowing the conservation of device power in appropriate device use scenarios.

DETAILED DESCRIPTION

The network and method will now be described by use of example embodiments. The example embodiments are presented in this disclosure for illustrative purposes, and not intended to be restrictive or limiting on the scope of the disclosure or the claims presented herein.

The methods and apparatus of the embodiments provide an advantage by allowing conservation of mobile device power in appropriate use conditions. The embodiments provide advantages over conventional methods and apparatus that do not allow or provide for certain use conditions to be taken into account to conserve device power.

In a conventional network, such as an LTE network, the modem of a mobile device may be in as connected state with the network even when the device's display screen power is turned off and the device is in a sleep state. The connected state may be entered from a standby or idle state from which an operating network (OS) application can change the device modem state to the connected state due to background data requests. For example, the connected state may be entered by the modem when a device is in sleep state but a data application on the device initiates a background data request to perform Teredo tunneling to transfer data. The Teredo tunneling may be as specified in the Internet Engineering Task Force (IETF) standards document RFC 4380.

Each time the device modem enters the connected state, the modem consumes power until the network or device transitions the modem back to an idle state. When the modem is in the connected state, the device may also conserve device power by enabling a discontinuous reception (DRX) mode feature of LTE. In DRX mode, the device starts an inactivity timer and determines if no data request is received during the inactivity timer period. If no data request is received during the inactivity timer period, the device activates DRX mode, first using one or more short DRX sleep cycles in which the device modem enters a sleep mode for short periods of time. In between the sleep mode periods of the short DRX cycles, the modem enters wake mode periods during which the device looks to detect any data requests. If no data request is detected during one of the wake mode periods of the short sleep cycles, the device enters long DRX sleep cycles. During the long DRX sleep cycles the device modem enters sleep mode periods that last a longer amount of time than used in the short DRX cycle sleep mode periods. The long DRX sleep cycles repeat until a data request is received. The short DRX sleep cycles are intended to allow any additional data accompanying the latest received data to be received quickly by the device because the device only sleeps for short periods when the device first goes into DRX mode.

Because a mobile device in sleep state may have the need to access modem data quite frequently, the modem may get transitioned to the connected state frequently and then take a long time to return to the idle state. For example, in the case of Teredo tunneling the modem connects every five minutes. In certain situations, the repeated entering and leaving of connected mode by a device modem may consume device battery power even when DRX mode is used. In this situation, the DRX mode may also be repeatedly activated when data transfer ends; and each time the DRX mode is activated, the mode will start with the one or more short DRX cycles before using the less power consuming long DRX cycles. In the case of a mobile device that may be left in sleep state for long periods lasting hours or days without a user nearby, it may be desirable to extend battery life as long as possible to prevent the device from running out of battery power and powering down.

The disclosed implementations take advantage of the use conditions of a mobile device to save device power in situations in which DRX mode may be extensively used. For example, when a device is in sleep state and the user is not close to device, the user may easily accept an extra delay in milliseconds when channels are setup and data is transferred. A device according to the implementation may dynamically adapt its use of DRX mode based on device use conditions and save power at the expense of this extra delay. For example, a device may determine if the device is in sleep state and if a user is not in proximity of the device. If the device is in sleep state and if a user is not in proximity of the device, the device may initiate removal of one or more short DRX sleep cycles from the DRX mode. Then, whenever DRX mode is used under those use conditions, short DRX sleep cycles will not be used and only the long sleep cycles will be used. In situations in which large amounts of data are transferred, the power saving may be significant. For example, in the case in which a Teredo tunneling connection is being made every five minutes for a mobile device in sleep state and having no user in proximity for hours or even days, the removal of the DRX short sleep cycle may significantly extend battery life.

Figure 1A:
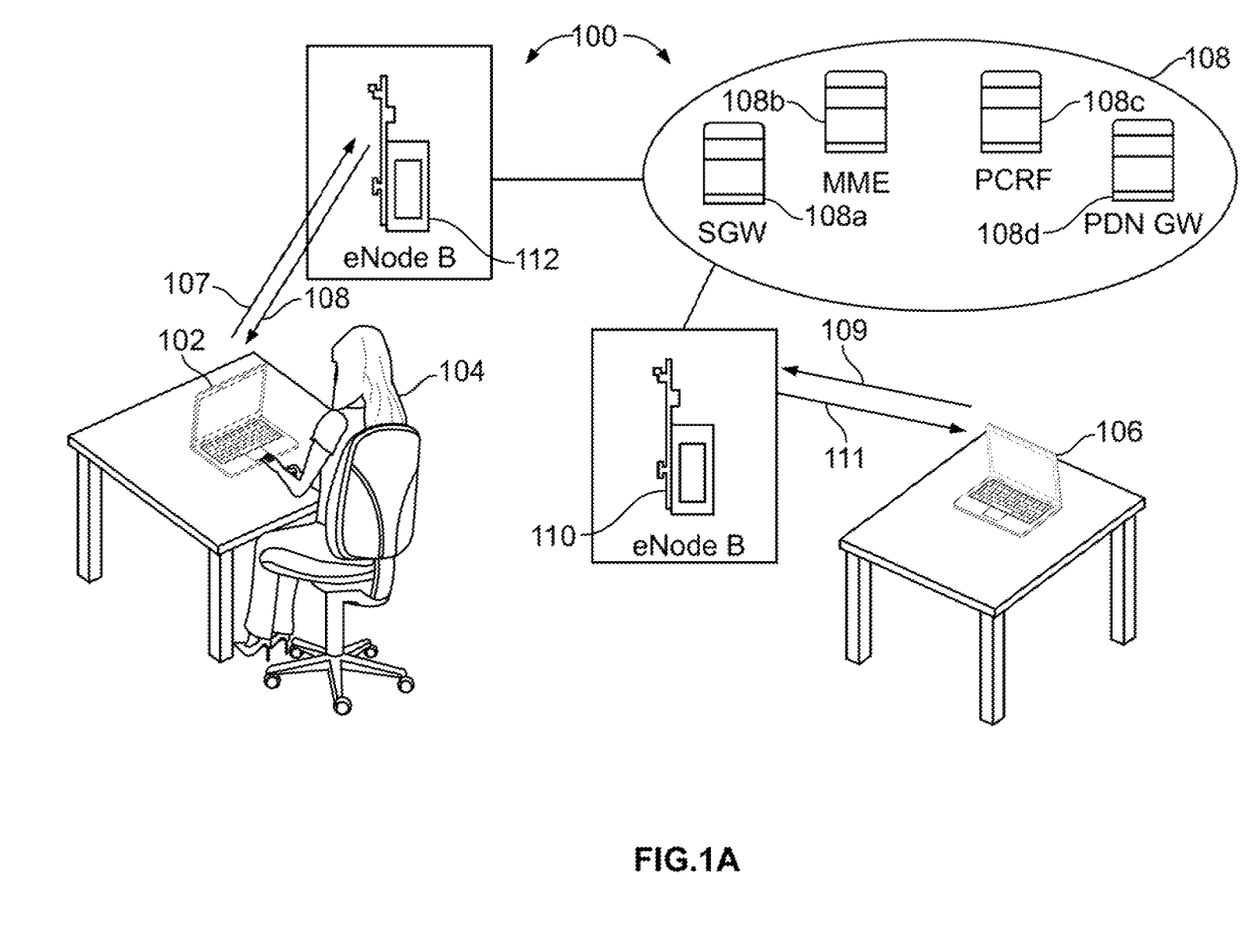
FIG. 1A is a diagram illustrating how an example device may be utilized in a network.

FIG. 1A is a diagram illustrating how an example device according to an implementation may be utilized in a network. FIG. 1A shows a network 100 including core network infrastructure 108, eNode B 110, and eNode B 112. Core network infrastructure includes serving gateway (SGW) 108a, mobility management entity (MME) 108b, policy and charging rules function (PCRF) 108c, and packet data network gateway (PDN GW) 108d. SGW 108a, MME 108b, PCRF 108c, and PDN GW 108d provide the functions for overall control and management of network 100. ENode B 110 and eNode B 112 provide radio channel interfaces for voice and data communications between the core network 108 and devices such as devices 102 and 106. In an example implementation, network 100 may operate according to the 3$^{rd}$ Generation Partnership Project (3GPP) LTE Standard Specifications. While devices 102 and 104 are shown in FIG. 1A as laptop computers, devices 102 and 104 may be implemented as any type of mobile computing or communications device, including a smart phone, a tablet computer, a desktop computer, gaming devices, media devices, smart televisions, multimedia cable/television boxes, smart phone accessory devices, tablet accessory devices, or personal digital assistants (PDAs).

Example devices 102 and 106 are shown operating in the RF coverage area of eNode B 112 and eNode B 110, respectively. Devices 102 and 106 may be configured to include appropriate circuitry/processors and program instructions that perform removal and reinstatement of a short sleep cycle of DRX based on conditions associated with device use. Device 102 is shown transmitting signals on uplink channel 107 to eNode B 112 and receiving signals on downlink channel 108 from eNode B 112. Similarly device 106 is shown transmitting signals on an uplink channel 109 to eNode B 110 and receiving signals on downlink channel 111 from eNode B 110. In an example scenario, the uplink signals 107 and 109 may include signals sent by devices 102 and 106 to eNode B 112 and eNode B 110, respectively. The downlink signals 108 and 111 may comprise signals sent to devices 102 and 106 from eNode B 112 and eNode B 110, respectively, including signals sent on a Physical Downlink Control Channel (PDCCH). The PDCCH carries device specific scheduling assignments for downlink resource allocation, uplink grants, Physical Random Access Channel (PRACH) responses, uplink power control commands, and common scheduling assignments for signaling messages (such as system information, paging, etc.) to mobile devices.

In the implementation of FIG. 1A, device 102 and 106 may be configured with a DRX mode having one or more short DRX sleep cycles and long DRX sleep cycles configured according to the 3GPP TS 36.321 V14.0.0 and 3GPP TS 36.331 V14.0.0 specifications. In the DRX mode of the implementation, the short DRX cycle may be dynamically removed or reinstated (if previously removed) according to device use conditions, including whether or not a user is in proximity of the device or whether or not the device is in sleep state, to extend battery lifetime.

When operating in LTE network 100 of FIG. 1A, a device in the Radio Resource Control (RRC) connected state with no data transfer, such as device 102 and 106, may be configured with the DRX mode having a period in which the device monitors the downlink PDCCH and, a period during which the device may skip monitoring/reception of the downlink PDCCH for battery saving purposes. The DRX mode may include both of one or more short DRX sleep cycles and long DRX sleep cycles. The transition between the short DRX sleep cycle, the long DRX sleep cycle and continuous reception may be controlled either by a timer in device 102 or 106 or by explicit commands received from an eNode B. For example, device 102 may check for scheduling messages by monitoring the device's cell radio network temporary identifier (C-RNTI) on the PDCCH during the "on duration" period of either a long DRX cycle or a short DRX cycle, depending on the currently active cycle. When a scheduling message is received during an on duration, device 102 starts a DRX inactivity timer and monitors the PDCCH in every PDCCH subframe while the DRX inactivity timer is running. During this period, device 102 may be regarded as being in a continuous reception mode.

Whenever a message is received while the DRX inactivity timer is running, device 102 restarts the DRX inactivity timer. When the DRX inactivity timer expires, device 102 moves into DRX mode. In the implementation, when device 102 moves into DRX mode it may move into a short DRX cycle or into the long DRX cycle depending on device use conditions. If it is determined, based on use conditions, that device 102 should move into a short DRX cycle, a short DRX cycle timer is started. The short DRX cycles will run until the DRX short cycle timer expires and then, device 102 will enter the long DRX cycles. The short DRX cycle timer determines how many short DRX sleep cycles will be repeated before long DRX sleep cycles are entered. If it is determined, based on use conditions, that device 102 should skip the short DRX cycles, device 102 moves directly into the long DRX cycle. The DRX cycle may also be initiated by means of a MAC Control Element (CE). Device 102 may also send a service request (SR), even when it is in DRX off period. But when device 102 sends a SR, it should monitor PDCCH continuously until it gets a downlink control information uplink grant (DCI-0).

As an example of how the implementations of devices 102 and 106 would function in network 100, device 102 may be operating using DRX mode including both short DRX sleep cycles and long DRX sleep cycles because device 102 may detect the proximity of user 104 near the device or the device may be in the wake state. If user 104 is in proximity of device 102 or the device 102 is in the wake state, both short DRX sleep cycles and long DRX sleep cycles will be used in DRX mode. In a scenario in which device 106 has been left unattended and has moved into a device sleep state with portions of the device powered down (displays, etc.), device 106 may be operating using DRX mode including only long DRX sleep cycles because device 102 may detect that there is no user in proximity of the device and the device is in sleep state. If no user is in proximity of device 106 and the device 102 is in the sleep state, only long DRX sleep cycles will be used in DRX mode.

Figure 1B:
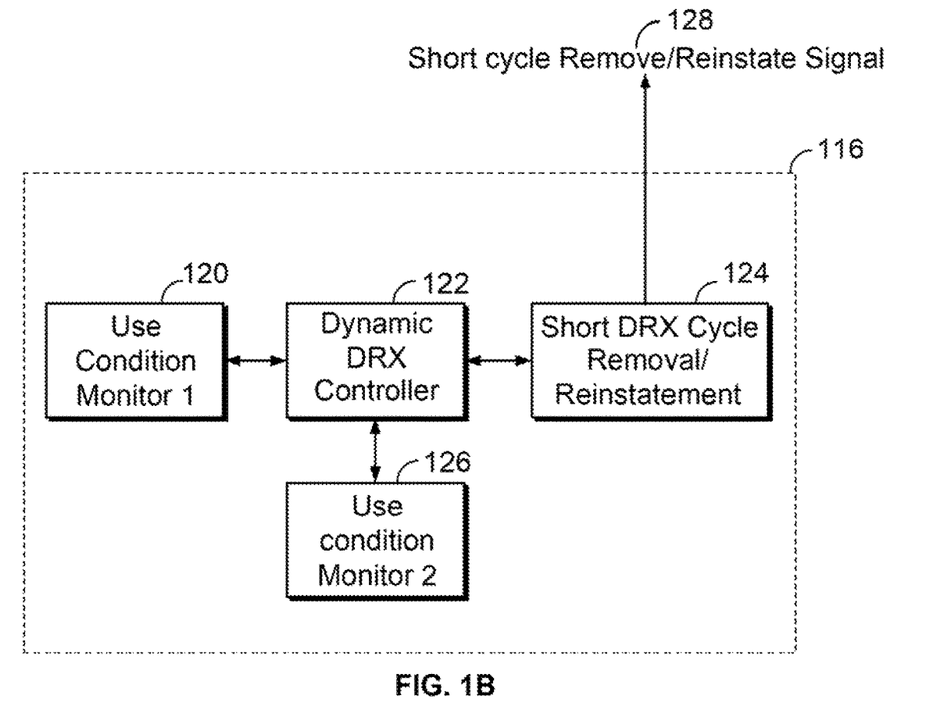
FIGS. 1B and 1C are simplified functional diagrams showing portions of example devices.
Figure 1C:
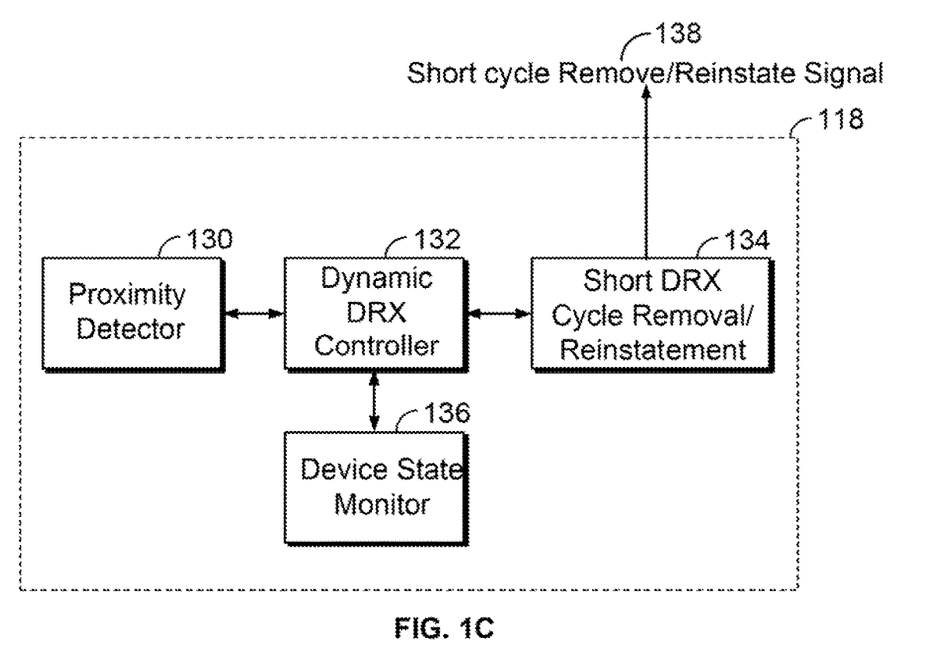

FIGS. 1B and 1C are simplified functional diagrams showing portions of an example device. FIG. 1B shows portion 116 which may comprise a portion of an implementation of device 102 or device 106. Portion 116 includes use condition monitor 1 120, use condition monitor 2 126, dynamic DRX controller 122, and short DRX cycle removal/reinstatement function 124. FIG. 1C shows portion 118 which may comprise a portion of another implementation of device 102 or device 106. Portion 118 includes use proximity detector 130, device state monitor 136, dynamic DRX controller 132, and short DRX cycle removal/reinstatement function 134. In each of the implementations of FIGS. 1B and 1C, portions 116 and 118 communicate with other functions on devices 102 and 106 to perform operations for dynamically removing/reinstating short DRX sleep cycles. Devices 102 and 106 may each include one or more processors, circuitry, and/or code comprising programs for implementing the functions shown in portions 116 or 118. The functions shown in portions 116 and 118 may be separately configured on device 102 and 106, or may be configured as combined, in whole or in part, with processors, circuitry, and/or code or programs that are also utilized for other functions on the devices.

Figure 2:
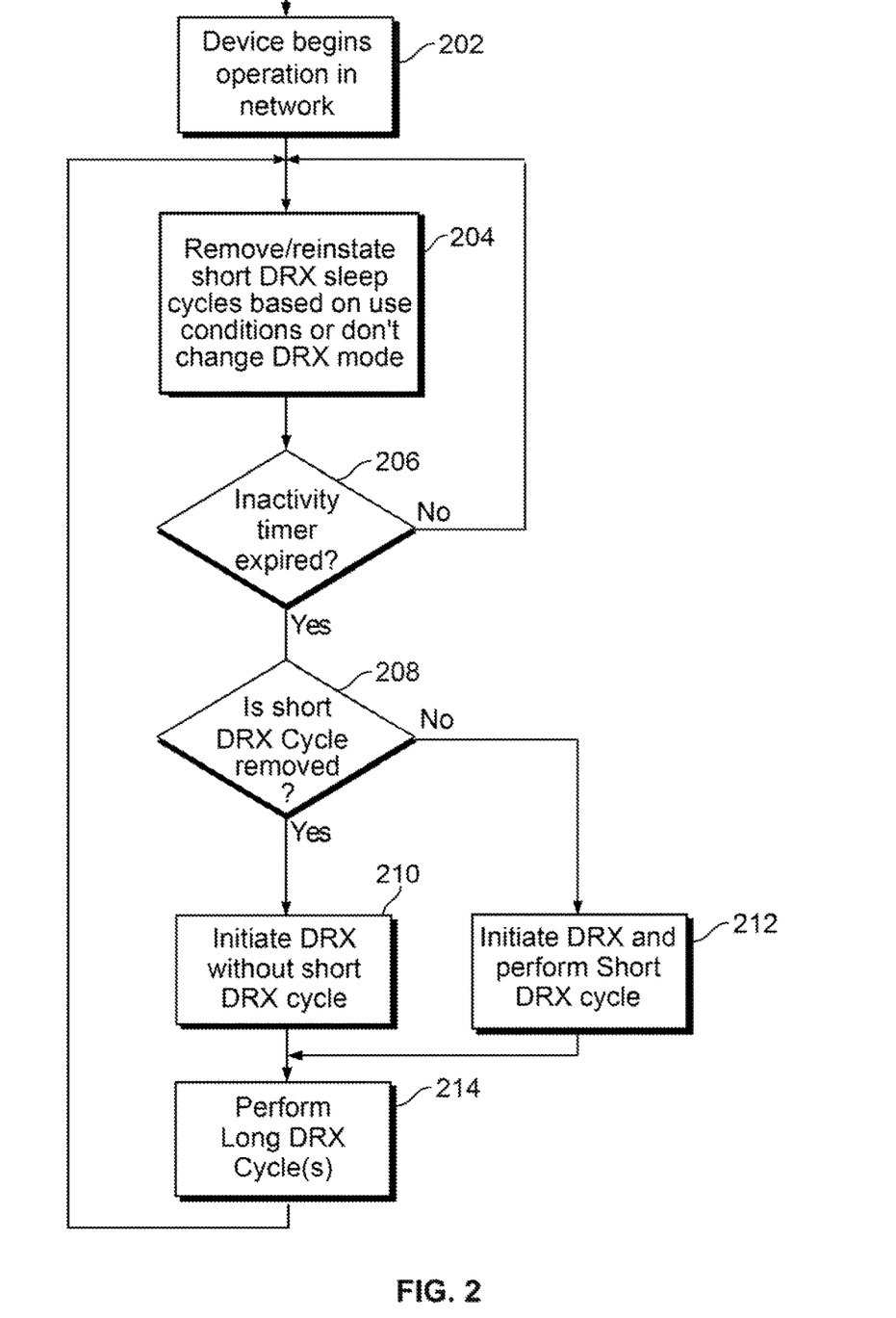
FIG. 2 is a flow diagram illustrating operations performed in an example device.

FIG. 2 is a flow diagram illustrating operations performed in an example device. FIG. 2 may be explained using an example of device 102 of FIG. 1A implemented to include portion 116 of FIG. 1B. Device 106 may also be configured to operate similarly to device 102 as described in this example.

The process begins at 202 where device 102 begins operation in network 100. Device 102 may receive and process data sent by eNode B 112 on downlink 108. Device 102 may also transmit data on uplink 107 to eNode B 112. In an example scenario user 104 may be in the proximity of device 102 while operating device 102, or may move away from device 102 during various time periods. Device 102 may be in continuous reception mode when transmitting and/or receiving data.

At 204, dynamic DRX controller 122 either removes/reinstates short DRX sleep cycles into DRX mode based on one or more device use conditions, or doesn't change DRX mode. Dynamic DRX controller 122 may provide instruction to short DRX cycle removal/reinstatement function 124 to send a control signal 128 to appropriate portions of device 102 to initiate the removal of the short DRX sleep cycles.

At 206, it is determined in device 102 if the inactivity timer is expired because no signals have been exchanged between device 102 and eNode B 112 for a selected period of time. If the inactivity tinier is not expired device 102, the process returns to 204 where dynamic DRX controller 122 again checks the one or more device use conditions and dynamic DRX controller 122 either removes or reinstates short DRX sleep cycles into DRX mode based on the one or more device use conditions, or does not change DRX mode. The process returns to 206 to determine if the inactivity timer is expired. The process repeats operations 204 and 206 until it is determined that the inactivity timer is expired at 206.

When it is determined that the inactivity timer is expired at 206, the process moves to 208. At 208, device 102 determines if the short DRX sleep cycle has been removed in the latest performance of operation 204. If the one or more short DRX sleep cycles have been removed, the process moves to 210 where device 102 leaves continuous reception mode and DRX mode is initiated without any short DRX sleep cycle. If the one or more short DRX sleep cycles have not been removed, the process moves to 212 where device 102 leaves continuous reception mode and DRX mode is initiated with the one or more short DRX sleep cycles. From either 210 or 212 the process moves to 214. At 214, DRX long sleep cycles are performed until a data request/data activity is detected at device 102. Device 102 then enters continuous mode and the process moves back to 204 and dynamic DRX controller 122 again checks device use conditions to determine if DRX should be modified by removing or reinstating the one or more short DRX sleep cycles.

Figure 3:
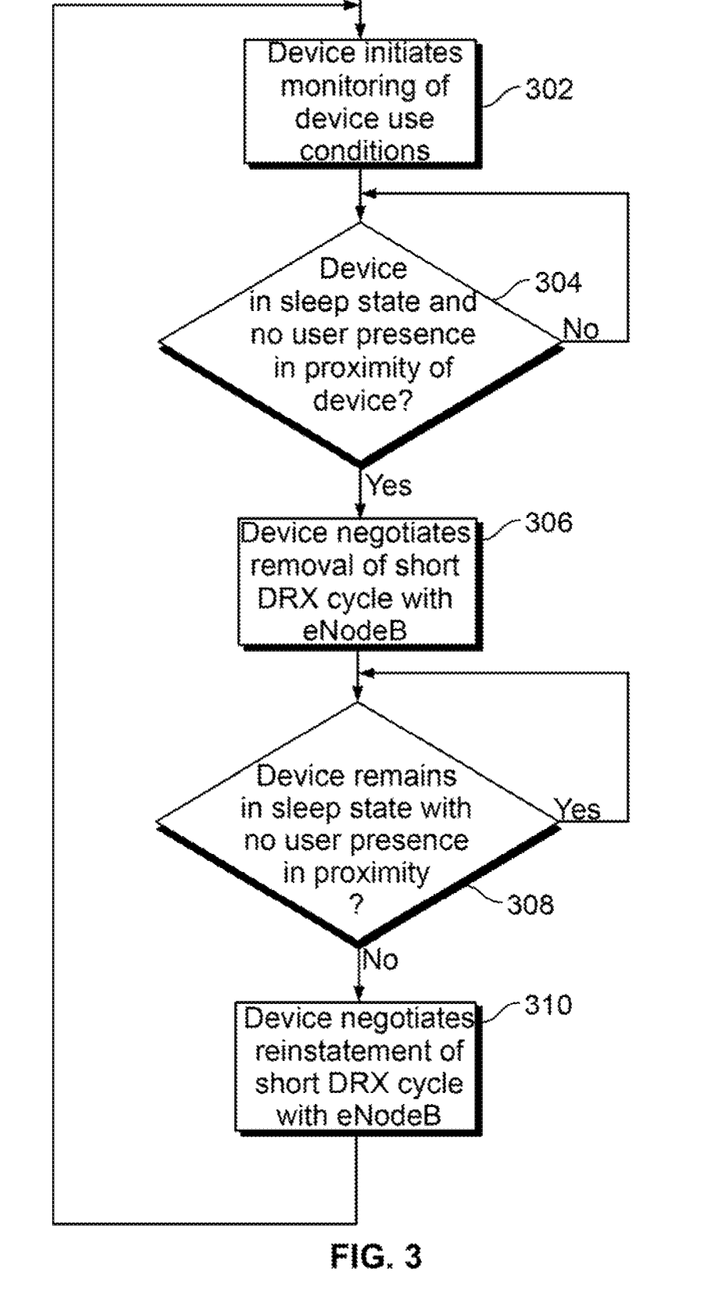
FIG. 3 is a flow diagram illustrating further operations performed in an example device.

FIG. 3 is a flow diagram illustrating further operations performed in an example device. FIG. 3 may be explained using an example of device 102 of FIG. 1A implemented to include portion 118 of FIG. 1C. Device 106 may also be configured to operate similarly to device 102 as described in this example.

FIG. 3 shows how device 102 may remove and reinstate the short DRX cycle from DRX mode as device 102 operates. The process of FIG. 3 may be performed independently of the connection state of device 102 with eNode B 112. For example, a modem of device 102 may be in either of a connected state or an idle state during performance of the process of FIG. 3.

The process begins at 302 where dynamic DRX controller 132 initiates monitoring of the use conditions of device 102. Dynamic DRX controller 132 monitors the use conditions by receiving inputs from proximity detector 130 and device state monitor 136 configured in portion 118 of device 102. Proximity detector 130 may be any type of detector that is used to detect the presence of a user in the proximity of a mobile device. For example, proximity detector 130 may include an infrared sensor, a camera, an ultrasonic sensor, an accelerometer, a gyroscope, or a force sensing resistor. Proximity detector 130 may also include features implemented in a touch screen. Proximity detector 130 may be configured to detect the presence of a user according to predetermined criteria. For example, proximity detection may include sensing that a user is touching, holding, or moving the device, or sensing motion of the user or sensing sounds made by the user within a predetermined distance of the device. The proximity detection may also include sensing and determining combinations of different criteria. The proximity detection may be set for Proximity detector 130 may set a presence flag if a user presence is detected in the proximity of device 102. In one implementation, proximity detector 130 may be implemented in a modem miniport driver in the modem of device 102 that checks a proximity sensor and sets the presence flag based on the sensor.

Device state monitor 136 may be any type of monitor or circuitry that is used to determine that device 102 is in a sleep state. For example, device state monitor 136 may be coupled to sleep state circuitry that shuts the display and other selected portions of device 102 down to save power if no keyboard or touchscreen activity is detected for a select amount of time. Device state monitor 136 may receive a signal from the sleep state circuitry indicating that device 102 is in the sleep state. Device state monitor 136 may set a sleep state flag if device 102 is in the sleep state. In one implementation, the device state monitor may be implemented in a modem miniport driver of device 102 that monitors OS power state and sets a flag when the state is sleep state. Once initiated, the monitoring of device use conditions by dynamic DRX controller 132 may continue repeatedly, at selected time intervals, independent of other operations in the process of FIG. 3 to set and reset the presence flag and the sleep state flag as device use conditions change.

At 304, dynamic DRX controller 132 determines if device 102 is in sleep state and if no user presence is detected in proximity of device 102 by checking the sleep state flag and presence flag. If it is determined that either device 102 is not in sleep state or that presence is detected in proximity of device 102, the process returns to 304 and dynamic RX controller 132 continues to monitor the sleep state flag and presence flag. If it is determined that device 102 is in sleep state and that no user presence is detected in proximity of device 102, the process moves to 306. At 306, dynamic DRX controller 132 may provide an instruction to short DRX sleep cycle removal/reinstatement function 124 to send a control signal 138 to appropriate portions of device 102 to initiate the removal of the short DRX sleep cycles. Device 102 may then exchange appropriate signals with eNode B 112 and negotiate the removal of the short DRX cycle from DRX mode. The negotiation at 306 may be according to the DRX setup negotiation procedures specified in the 3GPP TS 36.321 V14.0.0 and 3GPP TS 36.331 V14.0.0 specifications.

Next, at 308, dynamic DRX controller 132 determines if device 102 remains in sleep state with no user presence detected in proximity of device 102 by checking the sleep state flag and presence flag. If it is determined that device 102 remains in the sleep state with no user presence detected in proximity of device 102, the process returns to 308 and dynamic DRX controller 132 continues to monitor the sleep state flag and presence flag. If dynamic DRX controller 132 determines that device 102 does not remain in the sleep state or that a user presence is detected in proximity of device 102, the process moves to 310. At 310, dynamic DRX controller 132 may provide an instruction to short DRX cycle removal/reinstatement function 124 to send a control signal 138 to appropriate portions of device 102 to initiate the reinstatement of the short DRX sleep cycles. Device 102 may then exchange appropriate signals with eNode B 112 and negotiate the reinstatement of the short DRX cycle back into the DRX mode. The negotiation at 310 may be according to the DRX setup negotiation procedures specified in the 3GPP TS 36.321 V14.0.0 and 3GPP TS 36.331 V14.0.0 specifications.

Figure 4:
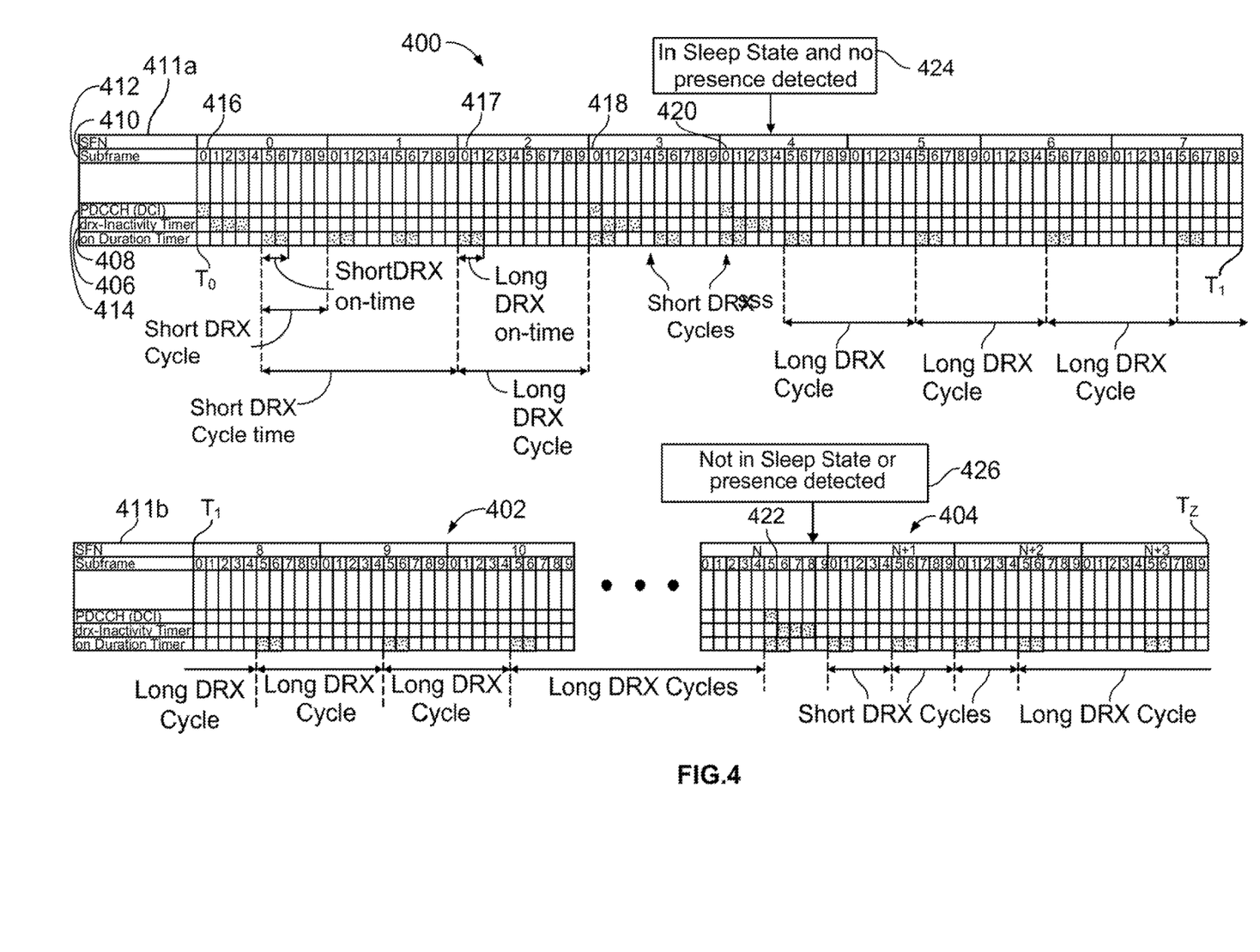
FIG. 4 is a timing chart illustrating example signal timing and timer states for an example use of discontinuous reception (DRX) mode; and, FIG. 5 is a simplified block diagram illustrating an example device.

FIG. 4 is a timing chart illustrating example signal timing and timer states for an example use of DRX mode in a device, such as device 102, according to an example implementation. Columns 411*a* and 411*b* include rows for System Frame Number (SFN) 410, subframes 412, PDCCH (DCI) 414, drx-inactivity timer 406, and on duration timer 408. FIG. 4 shows a timing sequence for PDCCH frames designated by System Frame Numbers (SFN) 410 in two rows from left to right along sequences 400, 402, and 404. Sequence 400 shows a sequence of frames numbered by SFN 0-7, sequence 402 shows frames numbered by SFN 8-10, and sequence 404 shows frames numbered by SFN N-(N+3). Subframes 412 indicate a row of subframes each of which are included in one of the frames. There are 10 subframes (0-9) in each frame. For example, the frame with SFN 0 includes 10 subframes designated by numbers 0-9, that start with subframe (0) 416. The rows for PDCCH (DCI) 414, drx-inactivity timer 406, and on duration tinier 408 indicate, from left to right, activity associated with the frames and subframes as the sequence of frames takes place in time from left to right. The shading in the box of each subframe column indicates that transmission/receive activity associated with the appropriate row is taking place during the subframe.

The implementation of dynamic DRX of FIG. 4 may be explained by starting at subframe (0) 416 of sequence 400. During subframe (0) 416, data activity on PDCCH 414 is taking place. The data activity may be data transmission from a base station to the mobile device. The activity ends at the end of subframe (0) and DRX-inactivity timer 406 is started in subframe (1) of SFN 0. DRX-inactivity timer 406 runs for 3 subframes 1-3 and then expires at subframe (4) of SFN 0. After a delay of one subframe, the expiration of DRX-inactivity timer 406 causes DRX mode to be activated at subframe 5 of SFN (5). At subframe 5, a short DRX sleep cycle that lasts for 5 subframes (5-9) is started. The short DRX sleep cycle has an on-time of two subframes 5-6) 406 and a sleep time of three subframes (7-9), as shown by on duration timer row 406. The short DRX sleep cycles are implemented with a short DRX cycle time of 15 subframes, so three short DRX sleep cycles are repeated over 15 subframes. Then, at subframe (0) 417 of SFN 2, a long DRX cycle is begun. The long DRX sleep cycle has an on-time of two subframes (0-1) of SFN 2, and a sleep time of eight subframes (2-9), as shown by on duration timer row 406. At 418, during the on time of the long DRX sleep cycle in subframe (0) of SFN 3, data activity is detected on the PDCCH 414. When the data activity stops, DRX-inactivity timer 406 starts and, runs for 3 subframes (1-3) of SFN 3 and then expires at subframe (4) of SFN 3. After a delay of one subframe, the expiration of DRX-inactivity timer 406 causes DRX mode to be activated at subframe (5) of SFN 3. When DRX mode starts again, at subframe 5, a short DRX sleep cycle is started. The short DRX sleep cycle lasts for 5 subframes (5-9). The short DRX sleep cycle has an on-time of two subframes, (5-6) 406 and a sleep time of three subframes (7-9), as shown by on duration timer row 406. Again, the short DRX sleep cycles are implemented with a short DRX cycle time of 15 subframes, so if no data activity is detected on PDCCH 414 three short DRX sleep cycles will be repeated over the 15 subframes. However, at subframe (0) 420 of SFN 4, data activity is detected on PDCCH 414. When this data activity ends, the DRX inactivity timer 406 is started to run for subframes (0-3) of SFN 4.

When the DRX inactivity timer 406 expires at subframe (4) of SFN 4, DRX mode is entered again. However, at his point in time, device use condition monitoring 424 indicates that the device is in the sleep state and that no user presence is detected in proximity to the device. These conditions may have been detected anytime subsequent to the last inactivity timer expiration at subframe (4) of SFN 3. Because the device is in the sleep state and no user presence is detected in proximity to the device, the device has negotiated the removal of the short DRX sleep cycles from DRX mode according to the processes of FIGS. 2 and 3. When DRX mode is entered upon the expiration of the DRX inactivity timer 406, the device will not perform the short DRX sleep cycles, but will instead begin DRX mode by initiating long DRX sleep cycles at subframe (5) of SFN 4. The long DRX sleep cycles may be repeated until data activity is again detected on PDDCH 414 during a long DRX sleep mode on-time.

In the example of FIG. 4, the long DRX sleep cycles continue through frames SFN 4 to SFN N in sequences 400, 402, and 404. Then at subframe (5) 422 of SRN N in sequence 404, data activity is detected on PDDCH 414 during the on time of a DRX long sleep cycle. When this data activity ends, the DRX inactivity timer 406 is started to run for subframes (6-8) of SFN N. When the DRX inactivity timer 406 expires at subframe (9) of SFN N, DRX mode is entered again. However, at his point in time, device use condition monitoring 426 indicates that the device is not in the sleep state or that a user presence is detected in proximity to the device. These conditions may have been detected anytime subsequent to the last inactivity timer expiration at subframe (3) of SFN 4. Because the device is either not in the sleep state or a user presence is detected in proximity to the device, the device has negotiated the reinstatement of the short DRX sleep cycles back into the DRX mode. When DRX mode is entered upon the expiration of the DRX inactivity timer 406, the device will not perform only the long DRX sleep cycles as occurred at subframe (5) of SFN4, but will instead begin DRX mode with short DRX sleep cycles at subframe (0) of SFN N+1. The short DRX sleep cycles are repeated three times according to the short DRX cycle time and long DRX sleep cycles are then again started at subframe (5) of frame SFN N+2 until data activity again occurs on PDCCH 414.

Figure 5:
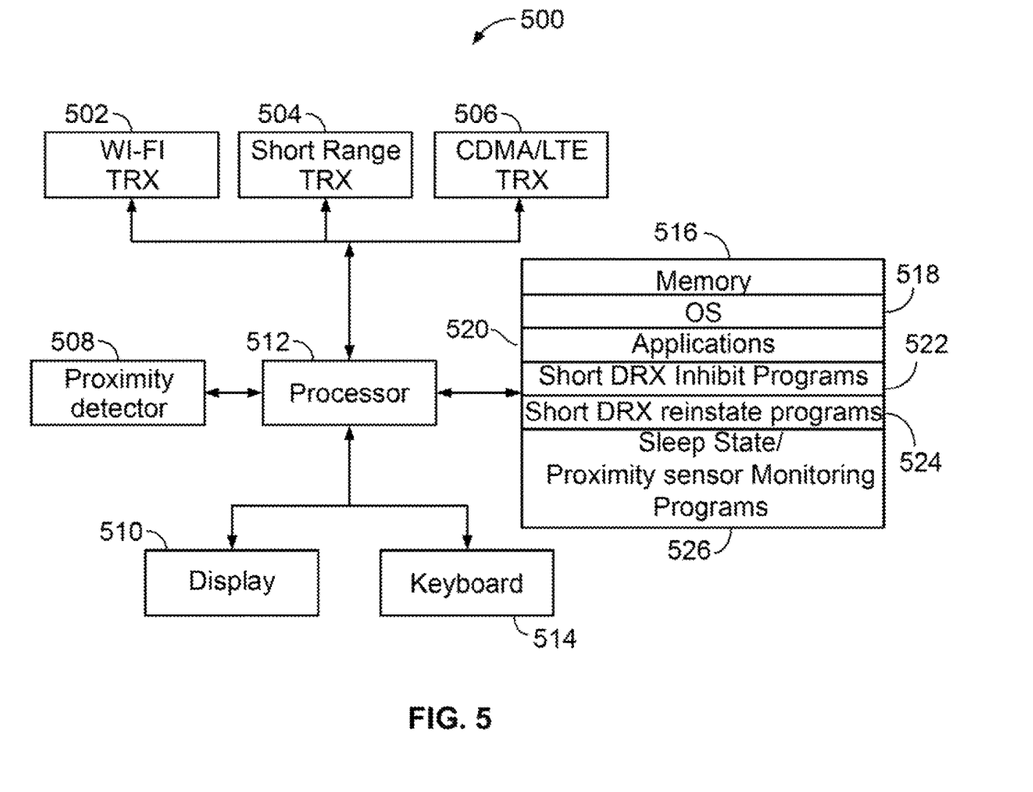

FIG. 5 is a simplified block diagram illustrating an example device 500. The functions for DRX mode shown in FIGS. 1A-1C, and in the operations of FIGS. 2-3, may be implemented on a device such as device 500. In an example implementation, device 500 may be implemented as a mobile device, such as devices 102 and 106 of FIG. 1A, operating according to a wireless communication standard such as the 3GPP long term evolution (LTE) standard. In other example implementations, device 500 may operate according to any other communication standard in which the DRX of the embodiments may be implemented. Device 500 may include a processor 512, memory 516, display 510, keyboard 514, proximity detector 508, Wi-Fi transceiver (TRX) 502, short range transceivers (TRX) 504, and WCDMA/LTE transceiver (TRX) 506. Memory 516 may be implemented as any type of computer readable storage media, including non-volatile and volatile memory. Memory 516 is shown as including program instructions for device operating network (OS) 518, device applications 520, short DRX inhibit programs 522, short DRX reinstate programs 524, and sleep state/proximity sensor monitoring programs 526.

Processor 512 may comprise one or more processors, or other control circuitry, or any combination of processors and control circuitry. Processor 512 provides overall control of device 500 by executing the program instructions in memory 516 for short DRX inhibit programs 522, short DRX reinstate programs 524, and sleep state/proximity sensor monitoring programs 526 in order to implement the functions for performing the removal and reinstatement of a short DRX sleep cycle according to the disclosed embodiments. In implementations of device 500, processor 512 may execute program instructions in memory 516 to execute the functions shown in FIGS. 1B and 1C that are described in relation to FIGS. 2-4. In other implementations, display 510 and keyboard 514 may be implemented with, or replaced with, any other type of interface such as a touchscreen, a virtual keypad, a voice controlled interface, interfaces that are gesture or motion based, an interface that receives input wirelessly, or any other type of interface that allows a user to control device 500 according to the embodiments.

In example implementations, device 500 may be any type of device configured to communicate with a network such as network 100. For example, device 500 may be implemented as a laptop computer (as shown in FIG. 1), a smart phone, a tablet computer, a desktop computer, remote sensing device, gaming devices, media devices, smart televisions, multimedia cable/television boxes, smart phone accessory devices, tablet accessory devices, or personal digital assistants (PDAs).

The example embodiments disclosed herein may be described in the general context of processor-executable program instructions stored on memory that may comprise one or more computer readable storage media (e.g., tangible non-transitory computer-readable storage media such as memory 516). As should be readily understood, the terms "computer-readable storage media" or "non-transitory computer-readable media" include the media for storing of data, and/or program instructions, such as memory 516, and do not include portions of the media for storing transitory propagated or modulated data communication signals.

While implementations have been disclosed and described as having functions implemented on particular wireless devices operating in a network, one or more of the described functions for the devices may be implemented on a different one of the devices than shown in the figures, or on different types of equipment operating in different networks. Also, while the functionality disclosed herein has been described by illustrative example using descriptions of the various components and devices of embodiments by referring to functional blocks and processors or processing units, controllers, and memory including instructions and code, the functions and processes of the embodiments may be implemented and performed using any appropriate functional blocks, type of processor, circuitry or combinations of processors and/or circuitry and code. This may include, at least in part, one or more hardware logic components. For example, and without limitation, illustrative types of hardware logic components that can be used include field programmable gate arrays (FPGAs), application specific integrated circuits (ASICs), application specific standard products (ASSPs), network-on-a-chip networks (SOCs), complex programmable logic devices (CPLDs), etc. Use of the term processor or processing unit in this disclosure is mean to include all such implementations.

The disclosed implementations include a device comprising one or more processors and memory in communication with the one or more processors, the memory comprising program instructions that when executed, causes the one or more processors to control the device to activate a discontinuous reception mode including a short sleep cycle and a long sleep cycle upon expiration of a data inactivity timer and deactivate the discontinuous reception mode upon detection of data activity, determine that at least one device use condition is met, and, in response to the determination that the at least one device use condition is met, initiate removal of the short sleep cycle from the discontinuous reception mode, and, activate the discontinuous reception mode without the short sleep cycle upon expiration of the data inactivity timer. The at least one device use condition may include a condition that that there is no user presence detected in proximity of the device. The at least one device use condition may include a condition that the device is in sleep state. The at least one use condition may include a condition that that there is no user presence detected in proximity of the device and a condition that the device is in sleep state and the program instructions may further cause the one or more processors to control the device to determine that at least one device use condition is met by determining that the conditions that there is no user presence detected in proximity of the device and the condition that the device is in sleep state are both met. The program instructions may further cause the one or more processors to control the device to determine that a selected use condition of the at least one device use condition is not met, and, in response to the determination that the selected condition of the at least one device use condition is not met, initiate reinstatement of the short sleep cycle in the discontinuous reception mode. The program instructions may further cause the one or more processors to control the device to initiate removal of the short sleep cycle by controlling the device to negotiate the removal of the short sleep cycle with a base station. The expiration of the timer of data inactivity may comprise a first expiration and the program instructions may cause the one or more processors to control the device to, in response to the determination that the at least one device use condition is met, initiate the removal of the short sleep cycle from the discontinuous reception mode upon a second expiration of the data inactivity timer. The device may further comprise a modem coupled to the one or more processors, the modem having an idle state and a connected state, wherein the device may determine that at least one device use condition is met when the modem is in either of the idle state or the connected state. The discontinuous reception mode may be activated and deactivated when the modem is in the connected state.

The disclosed implementations also include a device comprising one or more processors and memory in communication with the one or more processors, the memory comprising program instructions, that when executed, causes the one or more processors to control the device to determine that at least one device use condition is met, and, in response to the determination that the at least one device use condition is met, initiate reinstatement of a short sleep cycle in a discontinuous reception mode including a long sleep cycle, and, activate the discontinuous reception mode including the short sleep cycle and the long sleep cycle upon expiration of a data inactivity timer and deactivate the discontinuous reception mode upon a detection of data transfer activity. The at least one device use condition may include a condition that there is a user presence detected in proximity of the device. The at least one device use condition may include a condition that the device is in a wake state. The at least one device use condition may include a condition that that there is a user presence detected in proximity of the device and a condition that the device is in the wake state and the program instructions may further cause the one or more processors to control the device to determine that at least one device use condition is met by determining that one or the other of the condition that there is a user presence detected in proximity of the device or the condition that the device is in wake state are met. The program instructions may further cause the one or more processors to control the device to initiate reinstatement of the short sleep cycle by controlling the device to negotiate the reinstatement of the short sleep cycle with a base station. The device may further comprise a modem coupled to the one or more processors, the modem having an idle state and a connected state, wherein the device may determine that at least one device use condition is met when the modem is in either of the idle state or the connected state. The discontinuous reception mode may be activated and deactivated when the modem is in the connected state.

The disclosed implementations further include a device comprising one or more processors, a user presence detector coupled to the one or more processors, a modem coupled to the one or more processors, and, memory coupled to the one or more processors, the memory comprising program instructions, that when executed, causes the one or more processors to control the device to set the modem to a connected state, exchange data with a base station using the modem in the connected state, the exchange of data including use of a discontinuous reception mode including a short sleep cycle and long sleep cycle, wherein the discontinuous reception mode is activated upon expiration of a data inactivity timer and deactivated upon detection of data activity, determine that there is no user presence detected in proximity of the device by the user presence detector and that the device is in sleep mode, and, in response to the determination that there is no user presence detected in proximity of the device and that the device is in sleep mode, initiate removal of the short sleep cycle from the discontinuous reception mode, and, activate the discontinuous reception mode with the short sleep cycle removed upon expiration of the data inactivity timer. The program instructions may further cause the one or more processors to control the device to initiate removal of the short sleep cycle by controlling the device to negotiate the removal of the short sleep cycle with a base station. The modem may be set to an idle state and the connected state, and the discontinuous reception mode may be activated and deactivated when the modem is in the connected state. The device may determine that there is no user presence detected in proximity of the device by the user presence detector and that the device is in sleep state when the modem is in either of the idle state or the connected state.

Although the subject matter has been described in language specific to structural features and/or methodological operations or acts, it is to be understood that the subject matter defined in the appended claims is not necessarily limited to the specific features, operations, or acts described above. Rather, the specific features, operations, and acts described above are disclosed as example embodiments, implementations, and forms of implementing the claims and these example configurations and arrangements may be changed significantly without departing from the scope of the present disclosure. Moreover, although the example embodiments have been illustrated with reference to particular elements and operations that facilitate the processes, these elements, and operations may be combined with or, be replaced by, any suitable devices, components, architecture or process that achieves the intended functionality of the embodiment. Numerous other changes, substitutions, variations, alterations, and modifications may be ascertained to one skilled in the art and it is intended that the present disclosure encompass all such changes, substitutions, variations, alterations, and modifications as falling within the scope of the appended claims.

What is claimed is:

1. A device comprising:
   one or more processors; and
   memory in communication with the one or more processors, the memory comprising program instructions that when executed cause the one or more processors to control the device to:
      activate, upon expiration of a data inactivity timer, a discontinuous reception mode including one or more short sleep cycles followed by one or more long sleep cycles, and deactivate, upon detection of data activity, the discontinuous reception mode;
      determine that at least one device use condition is met, wherein the at least one device use condition includes at least one of a condition that there is no user presence detected in proximity of the device or a condition that the device is in a sleep state; and
      in response to the determination that the at least one device use condition is met:
         remove the one or more short sleep cycles from the discontinuous reception mode such that the discontinuous reception mode begins with the one or more long sleep cycles; and
         activate, upon expiration of the data inactivity timer, the discontinuous reception mode that begins with the one or more long sleep cycles such that the device transitions from a continuous reception mode to the one or more long sleep cycles.

2. The device of claim 1, wherein the at least one device use condition includes a condition that there is no user presence detected in proximity of the device and a condition that the device is in the sleep state, and the program instructions further cause the one or more processors to control the device to determine that the at least one device use condition is met by determining that the condition that there is no user presence detected in proximity of the device and the condition that the device is in the sleep state are both met.

3. The device of claim 1, wherein the program instructions further cause the one or more processors to control the device to:
   determine that a selected condition of the at least one device use condition is not met; and,
   in response to the determination that the selected condition of the at least one device use condition is not met:
      initiate reinstatement of the one or more short sleep cycles in the discontinuous reception mode.

4. The device of claim 1, wherein the program instructions further cause the one or more processors to control the device to remove the one or more short sleep cycles by controlling the device to negotiate the removal of the one or more short sleep cycles with a base station.

5. The device of claim 1, wherein the expiration of the data inactivity timer comprises a first expiration and the program instructions cause the one or more processors to control the device to, in response to the determination that the at least one device use condition is met, initiate the removal of the one or more short sleep cycles from the discontinuous reception mode upon a second expiration of the data inactivity timer.

6. The device of claim 1 further comprising a modem coupled to the one or more processors, the modem having an idle state and a connected state, wherein the device may determine that the at least one device use condition is met when the modem is in either of the idle state or the connected state.

7. The device of claim 6, wherein the discontinuous reception mode is activated and deactivated when the modem is in the connected state.

8. A device comprising:
   one or more processors; and
   memory in communication with the one or more processors, the memory comprising program instructions that when executed cause the one or more processors to control the device to:
      determine that at least one device use condition is met, wherein the at least one device use condition includes at least one of a condition that there is a user presence detected in proximity of the device or a condition that the device is in a wake state; and in response to the determination that the at least one device use condition is met:

reinstate one or more short sleep cycles in a discontinuous reception mode that does not already include the one or more short sleep cycles such that the discontinuous reception mode includes the one or more short sleep cycles and one or more long sleep cycles; and activate, upon expiration of a data inactivity timer, the discontinuous reception mode including the one or more short sleep cycles and the one or more long sleep cycles and deactivate, upon a detection of data transfer activity, the discontinuous reception mode.

9. The device of claim 8, wherein the at least one device use condition includes a condition that there is a user presence detected in proximity of the device and a condition that the device is in a wake state and the program instructions further cause the one or more processors to control the device to determine that the at least one device use condition is met by determining that one or the other of the condition that there is a user presence detected in proximity of the device or the condition that the device is in the wake state are met.

10. The device of claim 8, wherein the program instructions further cause the one or more processors to control the device to reinstate the one or more short sleep cycles by controlling the device to negotiate reinstatement of the one or more short sleep cycles with a base station.

11. The device of claim 8, further comprising a modem coupled to the one or more processors, the modem having an idle state and a connected state, wherein the device may determine that at least one device use condition is met when the modem is in either of the idle state or the connected state.

12. The device of claim 11, wherein the discontinuous reception mode is activated and deactivated when the modem is in the connected state.

13. A device comprising:
one or more processors;
a user presence detector coupled to the one or more processors;
a modem coupled to the one or more processors; and
memory coupled to the one or more processors, the memory comprising program instructions, that when executed, cause the one or more processors to control the device to:

set the modem to a connected state;

exchange data with a base station using the modem in the connected state, the exchange of data including use of a discontinuous reception mode including one or more short sleep cycles followed by one or more long sleep cycles, wherein the discontinuous reception mode is activated upon expiration of a data inactivity timer and deactivated upon detection of data activity;

determine that there is no user presence detected in proximity of the device by the user presence detector and that the device is in sleep mode; and in response to the determination that there is no user presence detected in proximity of the device and that the device is in the sleep mode:

remove the one or more short sleep cycles from the discontinuous reception mode such that the discontinuous reception mode begins with the one or more long sleep cycles; and activate, upon expiration of the data inactivity timer, the discontinuous reception mode with the one or more short sleep cycles removed such that the device transitions from a continuous reception mode to the one or more long sleep cycles.

14. The device of claim 13, wherein the program instructions further cause the one or more processors to control the device to remove the one or more short sleep cycles by controlling the device to negotiate the removal of the one or more short sleep cycles with the base station.

15. The device of claim 13, wherein the modem may be set to an idle state and the connected state, and the discontinuous reception mode is activated and deactivated when the modem is in the connected state.

16. The device of claim 13, wherein the device determines that there is no user presence detected in proximity of the device by the user presence detector and that the device is in a sleep state when the modem is in either of an idle state or the connected state.

* * * * *